(12) United States Patent
Cholewa et al.

(10) Patent No.: US 7,388,201 B2
(45) Date of Patent: Jun. 17, 2008

(54) RADIATION DETECTOR HAVING COATED NANOSTRUCTURE AND METHOD

(75) Inventors: Marian Cholewa, Singapore (SG); Shu Ping Lau, Singapore (SG); Gyu-Chul Yi, Pohang (KR); Jin Kyoung Yoo, Seongnam (KR); Adrian Paul Burden, Singapore (SG); Lei Huang, Singapore (SG); Xingyu Gao, Singapore (SG); Andrew Thye Shen Wee, Singapor (SG); Herbert Oskar Moser, Singapore (SG)

(73) Assignees: National University of Singapore, Singapore (SG); Agency for Science, Technology and Research, Centros (SG); Pohang University of Science and Technology, Kyunbuk-Do (KR); Nanyang Technological University, Singapore (SG)

( * ) Notice: Subject to any disclaimer, the term of this patent is extended or adjusted under 35 U.S.C. 154(b) by 326 days.

(21) Appl. No.: 11/129,582

(22) Filed: May 13, 2005

(65) Prior Publication Data

US 2006/0255287 A1 Nov. 16, 2006

(51) Int. Cl.
*G01N 23/00* (2006.01)
(52) U.S. Cl. .................. 250/310; 250/251; 250/492.1; 250/396 R; 250/281; 250/207; 250/397; 250/395; 250/366; 250/220; 250/370.4; 250/389; 428/432; 428/364; 428/447.3; 313/491; 313/311; 313/346 R; 313/105 R; 204/192.15; 204/192.13; 997/901
(58) Field of Classification Search ............... 250/310, 250/397, 368, 251, 492.1, 396 R, 281, 207, 250/395, 366, 370.4, 389, 220; 204/403.1, 204/400, 192.15, 192.13; 428/432, 364, 428/447.3; 313/491, 311, 346 R, 105 R; 997/901
See application file for complete search history.

(56) References Cited

U.S. PATENT DOCUMENTS 5,168,540 A 12/1992 Winn et al.
(Continued)

FOREIGN PATENT DOCUMENTS

EP 0 475 520 A2 3/1992
(Continued)

OTHER PUBLICATIONS

Kim et al. "Secondary electron emission from magnesium oxide on multiwalled carbon nanotubes" Applied Physics Letters (2002) vol. 81, p. 1098.*

(Continued)

*Primary Examiner*—Jack Berman
*Assistant Examiner*—Meenakshi S Sahu
(74) *Attorney, Agent, or Firm*—Dinsmore & Shohl LLP

(57) ABSTRACT

A radiation detector has an electron emitter that includes a coated nanostructure on a support. The nanostructure can include a plurality of nanoneedles. A nanoneedle is a shaft tapering from a base portion toward a tip portion. The tip portion has a diameter between about 1 nm to about 50 nm and the base portion has a diameter between about 20 nm to about 300 nm. Each shaft has a length between about 100 nm to about 3,000 nm and an aspect ratio larger than 10. A coating covers at least the tip portions of the shafts. The coating exhibits negative electron affinity and is capable of emitting secondary electrons upon being irradiated by radiation. The nanostructure can also include carbon nanotubes (CNTs) coated with a material selected from the group of aluminum nitride (AlN), gallium nitride (GaN), and zinc oxide (ZnO). The detector further includes an electron collector positioned to collect electrons emitted from the electron emitter and to produce a signal indicative of the amount of electrons collected, and a signal processor operatively connected to the electron collector for processing the signal to determine a characteristic of the radiation. The detector can be used to detect radiations of changed particles or light such as X-ray.

29 Claims, 5 Drawing Sheets

U.S. PATENT DOCUMENTS

| | | |
|---|---|---|
| 6,712,864 B2 | 3/2004 | Horiuchi et al. |
| 6,787,122 B2 | 9/2004 | Zhou |
| 6,790,426 B1 | 9/2004 | Ohsaki |
| 2002/0172820 A1 | 11/2002 | Majumdar et al. |
| 2002/0175408 A1 | 11/2002 | Majumdar et al. |
| 2003/0089899 A1 | 5/2003 | Lieber et al. |
| 2003/0213428 A1 | 11/2003 | Lu et al. |
| 2004/0063100 A1 | 4/2004 | Wang |
| 2004/0150311 A1 | 8/2004 | Jin |

FOREIGN PATENT DOCUMENTS

| | | |
|---|---|---|
| JP | 2004149954 A * | 5/2004 |
| WO | WO 01/12433 A2 | 2/2001 |
| WO | WO 03/075299 A2 | 9/2003 |

OTHER PUBLICATIONS

Dong et al. "ZnO nanowires formed on tungsten substrates and their electron field emission properties" Applied Physics Letters (2003), vol. 82, p. 1096.*

Lebow Company webpage "Evaporated Thin Films and Coatings" as of Apr. 5, 2005 using the Internet archive Wayback Machine, retrieved from the Internet on May 2, 2007 <URL:http://web.archive.org/web/20050307160429/www.lebowcompany.com/new_page_1.htm>.*

"Secondary electron emission proeprties of III-nitride/ZnO cpaxial heterostructure under ion and X-ray bombardment", M. Cholewa, H.O. Moser, L. Huang, S.P. Lau, J. Yoo, S.J. An, G-C Yi, G. Xingyu, A.T.S. Wee, A. Bettiol, F. Watt, B. Fisher, Nuclear Instruments and Mehtods in Physics Research B 254 (2007), pp. 55 to 58.*

"Development of Highly Efficient and High Speed X-ray detectors using Modern Nanomaterials", M. Cholewa, S.P. Lau, G. Xingyu, A.T.S Wee, W. Polak, J. Lekki, Z. Stachura, H.O. Moser, Synchrotron Radiation Instrumentation: Ninth Annual Conference, edited by J-Y Choi and S. Rah, 2007, pp. 1097 to 1100.*

"ZnO Nanoneedles grown vertically on Si substrates by non-catalytic vapor-phase Epitaxy" W. Park, G-Y Yi, M. Kim and S. Pennycook, Adv. Mater. 14, No. 24, Dec. 17, 2002 pp. 1841 to 1843.*

S.M. Yoon et al., "Comparison of the Field Emissions Between Highly Ordered Carbon Nanotubes with Closed and Open Tips", Applied Physics Letters, 2004, pp. 825-827, vol. 84, No. 5.

Sun Jin An et al., "Heteroepitaxial Fabrication and Structural Characterizations of Ultrafine GaN/ZnO Coaxial Nanorod Heterostructures", Applied Physics Letters, 2004, pp. 3612-3614, vol. 84, No. 18.

M. Cholewa et al., "Diamond Membranes: Applications for Single Ion Detection Using Secondary Electron Emission", Diamond and Related Materials, 1998, pp. 510-512, vol. 7, No. 2.

B.E. Fischer et al., "Some Experiences on the Way to Biological Single Ion Experiments", 2001, Nuclear Instruments and Methods in Physics Research B, 2001, pp. 60-65, vol. 181, issues 1-4.

M. Cholewa and E. Koschiy, "Thin Diamond Film as Highly Efficient Detector for Charged Particles", Gesellschaft Fur Schwerionenforschung (GSI) Scientific Report 2003, 2004.

Y.G. Wang et al., "Comprehensive Study of ZnO Films Prepared by Filtered Cathodic Vaccuum Arc at Room Temperature", Journal of Applied Physics, 2003, pp. 1597-1604, vol. 94, No. 3.

Tae Yun Kim et al., "Growth Mechanism of Needle-Shaped ZnO Nanostructures Over NiO-coated Si Substrates", Korean Journal of Chemical Engineering, 2004, pp. 733-738, vol. 21.

T. Kamiya et al., "Secondary Electron Emission from Boron-Doped Diamond Under Ion Impact: Applications in Single-Ion Detection", Applied Physics Letters, 1997, pp. 1875-1877, vol. 71.

Whikun Yi et al., "Secondary Electron Emission Yields from MgO Deposited on Carbon Nanotubes", Journal of Applied Physics, 2001, pp. 4091-4095, vol. 89, No. 7.

W.K. Li et al., "Field-Emission Characteristics from Wide-Bandgap Material- Coating Carbon Nanotubes", Advanced Materials, 2002, pp. 1464-1468, vol. 14, No. 20.

Won Seok Kim et al., "Secondary Electron Emission from Magnesium Oxide on Multiwalled Carbon Nanotubes", Applied Physics Letters, 2002, pp. 1098-1100, vol. 81, No. 6.

Won Il Park et al., "ZnO Nanoneedles Grown Vertically on Si Substrates by Non-Catalytic Vapor-Phase Epitaxy", Advanced Materials, 2002, pp. 1841-1843, vol. 14, No. 24.

J.T.L. Thong et al., "High-current Field Emission from a Vertically Aligned Carbon Nanotube Field Emitter Array", Applied Physics Letters, 2001, pp. 2811-2813, vol. 79, No. 17.

M. Cholewa et al., "Preparatory Experiments for a Signle Ion Hit Facility at GSI", Nuclear Instruments & Methods in Physics Research B, 2003, pp. 296-301, vol. 210.

M. Tanemura et al., "Room-temperature Growth of a Carbon Nanofiber on the Tip of Conical Carbon Protrusions", Applied Physics Letters, 2004, pp. 3831-3833, vol. 84, No. 19.

Y.B. Li et al., "MoS Nanoflowers and their Field-Emission Properties", Applied Physics Letters, 2003, pp. 1962-1964, vol. 82, No. 12.

O. Ambacher, "Growth and Applications of Group III-Nitrides", Journal of Physics D: Applied Physics, 1998, pp. 2653-2710, vol. 31.

C.R. Rao et al., "Inorganic Nanowires", Progress in Solid State Chemistry, 2003, pp. 5-147, vol. 31.

Segi Yu et al., "Field Emission Energy Distribution of MgO-Coated MWCNTs", Physica B, 2002, pp. 177-179, vol. 323.

H. Seiler, "Secondary Electron Emission in the Scanning Electron Microscope", Journal of Applied Physics, 1983, pp. R1-R18, vol. 54, No. 11.

Y.B. Li et al., "ZnO Nanoneedles with Tip Surface Perturbations: Excellent Field Emitters", Applied Physics Letters, 2004, pp. 3603-3605, vol. 84, No. 18.

Niels De Jonge, "Brightness of Carbon Nanotube Electron Sources", Journal of Applied Physics, 2004, pp. 673-681, vol. 95, No. 2.

Glenn F. Knoll, "Radiation Detection and Measurement", 3rd Ed., John Wiley & Sons, Inc., 2000, New York.

* cited by examiner

RADIATION DETECTOR HAVING COATED NANOSTRUCTURE AND METHOD

FIELD OF THE INVENTION

The present invention relates generally to radiation detectors, and more particularly to radiation detectors having coated nanostructures and related methods.

BACKGROUND OF THE INVENTION

It is known to use detectors that have a secondary-electron emitter to detect radiation of charged particles or photons. The emitter can emit secondary electrons upon being irradiated. The emitted electrons are collected to produce a signal to indicate the presence or a characteristic, such as energy, of the radiation.

Typically, not every radiation quanta incident on an electron emitter causes an emission. Thus, radiation detectors have less than 100% detection efficiency. It is desirable that a radiation detector has high detection efficiency.

For example, PCT application publication WO 03/075299, published on Sep. 12, 2003, entitled "Device for detecting charged particles and photons," to Bernd Fischer and Marian Cholewa ("Fischer"); and a report authored by M. Cholewa and E. koshchiy, "Thin Diamond film as highly efficient detector for changed particles," Gesellschaft für Schwerionenforschung (GSI) Scientific Report 2003, (2004), p. 156, ("Cholewa"), each of which is incorporated herein by reference, disclose a detector consisting of a thin diamond layer on a supporting Si substrate and an electron multiplier unit. The diamond film is boron-doped and has high secondary electron emission yield. The detector is said to have almost 100% efficiency for detecting radiation of ions. However, detection efficiency for light radiations such as X-rays has not been reported and is expected to be lower. Further, boron-doped diamond film can be expensive and the production cost for radiation detectors having boron-doped diamond film as the electron emitter can be high. Thus, alternative or cheaper electron emitters with similar or even higher detection efficiencies are still desirable.

Several other techniques can be used to improve detection efficiency. For example, increasing the energy of incident radiation or subjecting the emitter to a high biasing voltage can increase emission efficiency. However, these techniques have limited applications and have limited effects. For instance, the energy of radiation to be detected may not be controllable; the biasing voltage cannot be increased without limit. It is desirable that high detection efficiency can be achieved over a wide range of radiation energy, biasing voltage, and types of radiations.

It has been reported that MgO coated on the tips of vertically-grown multiwalled carbon nanotubes (MWCNTs) can produce high secondary electron emissions by applying a high bias voltage of 800V. See for example, Won Seok Kim, Applied Physics Letters, (2002), vol. 81, pp. 1098-1100 ("Kim"), which is incorporated herein by reference. However, in this approach, good quality of MgO coating can only be produced by electron-beam evaporation, which leads to certain drawbacks such as limited coating area and high cost of equipment and production. Further, emitters that can exhibit even higher emission yields at low bias are still desirable.

Thus, there is a need for radiation detectors with alternative or improved electron emitters and have high detection efficiencies. Further, there is a need for radiation detectors that can be manufactured at reduced costs.

SUMMARY OF THE INVENTION

According to an aspect of the invention, a radiation detector includes an electron emitter including a support, and a plurality of shafts extending from the support. Each one of the plurality of shafts tapers from a base portion toward a tip portion. The tip portion has a diameter between about 1 nm to about 50 nm and the base portion has a diameter between about 20 nm to about 300 nm. Each shaft has a length between about 100 nm to about 3,000 nm. Each shaft has an aspect ratio larger than 10. A coating covers at least the tip portions of the plurality of shafts. The coating exhibits negative electron affinity and is capable of emitting secondary electrons upon being irradiated by radiation. An electron collector is positioned to collect electrons emitted from the electron emitter and to produce a signal indicative of the amount of electrons collected. A signal processor is operatively connected to the electron collector for processing the signal to determine a characteristic of the radiation.

According to another aspect of the invention, there is provided a radiation detector that includes an electron emitter having a supporting surface and a nanostructure disposed on the supporting surface. The nanostructure comprises carbon nanotubes (CNTs) coated with a material selected from the group of aluminum nitride (AlN), gallium nitride (GaN), and zinc oxide (ZnO). The nanostructure is capable of emitting secondary electrons upon being irradiated by radiation. The radiation detector further includes an electron collector for collecting electrons emitted from the electron emitter and for producing a signal indicative of the amount of electrons collected; and a signal processor operatively connected to the electron collector for processing the signal to determine a characteristic of the radiation.

According to another aspect of the invention, there is provided a method of detecting radiation, by directing radiation to a nanostructure comprising a plurality of shafts, each one of the shafts having a surface layer exhibiting negative electron affinity, the surface layer having substantially uniform thickness; and detecting secondary electrons excited by the radiation and emitted from the nanostructure so as to detect the radiation.

According to another aspect of the invention, a radiation detector includes an electron emitter including a support and a plurality of shafts extending from the support. Each one of the plurality of shafts tapers from a base portion toward a tip portion. The tip portion has a diameter between about 1 nm to about 50 nm and the base portion has a diameter between about 20 nm to about 300 nm. Each shaft has a length between about 100 nm to about 3,000 nm. Each shaft has an aspect ratio larger than 10. A coating covers at least the tip portions of the plurality of shafts. The coating exhibits negative electron affinity and is capable of emitting secondary electrons upon being irradiated by radiation. The shafts may be made substantially of ZnO.

According to another aspect of the invention, there is provided a radiation detector that includes an electron emitter having a supporting surface and a nanostructure disposed on the supporting surface. The nanostructure includes carbon nanotubes (CNTs) coated with a material selected from the group of aluminum nitride (AlN), gallium nitride (GaN), and zinc oxide (ZnO). The nanostructure is capable of emitting secondary electrons upon being irradiated by radiation.

According to an aspect of the invention, a radiation detector includes an electron emitter including a support, and a plurality of nanoneedles extending from the support. A coating covers at least a tip portion of each one of the nanoneedles. The coating exhibits negative electron affinity and is capable of emitting secondary electrons upon being irradiated by radiation. An electron collector is positioned to collect electrons emitted from the electron emitter and to produce a signal indicative of the amount of electrons collected. A signal processor is operatively connected to the electron collector for processing the signal to determine a characteristic of the radiation.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures, which illustrate exemplary embodiments of the invention.

DETAILED DESCRIPTION

Figure 1:
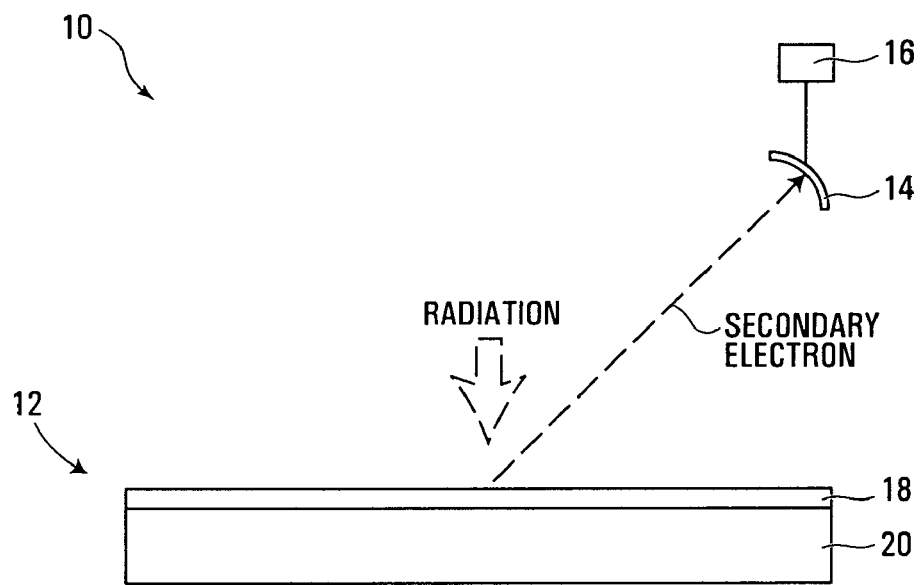
FIG. 1 is a schematic diagram illustrating a radiation detector, exemplary of an embodiment of the present invention.

FIG. 1 is a simplified schematic diagram of a radiation detector 10, exemplary of an embodiment of the invention. Detector 10 includes an electron emitter 12, an electron collector 14 and a signal processor 16. As used herein, a radiation detector includes any radiation based detecting, sensing, or imaging device.

Electron emitter 12 has an emitting structure 18 formed on a support 20, which can emit secondary electrons under radiation of charged particles, photons or an electromagnetic wave. Charged particles can be electrons, protons, ions, and the like. Photon radiation can be light in UV portion of the spectrum, and the like. Electromagnetic radiation can be X-ray radiation and the like.

Figure 2:
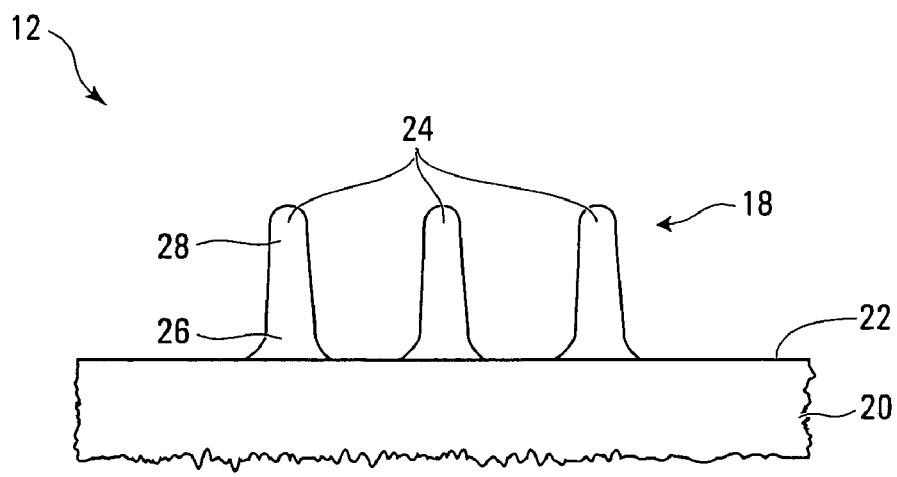
FIG. 2 is a schematic plan view of an exemplary electron emitter for the detector of FIG. 1.

FIG. 2 illustrates an exemplary emitter 12. Emitting structure 18 is formed on a supporting surface 22 of substrate or support 20. Substrate 20 can be made from any suitable material on which emitting structure 18 can be formed, which will be described further below. Suitable materials for substrate 20 include silicon (Si), sapphires, gallium arsenic (GaAs), silicon carbide (SiC), zinc oxide (ZnO), gallium nitrite (GaN), and the like, depending on the emitting layer material and the application. Si is suitable for use in combination with many different emitter layer materials. Support 20 may also be made of the same material as emitting structure 18.

Figure 5A:
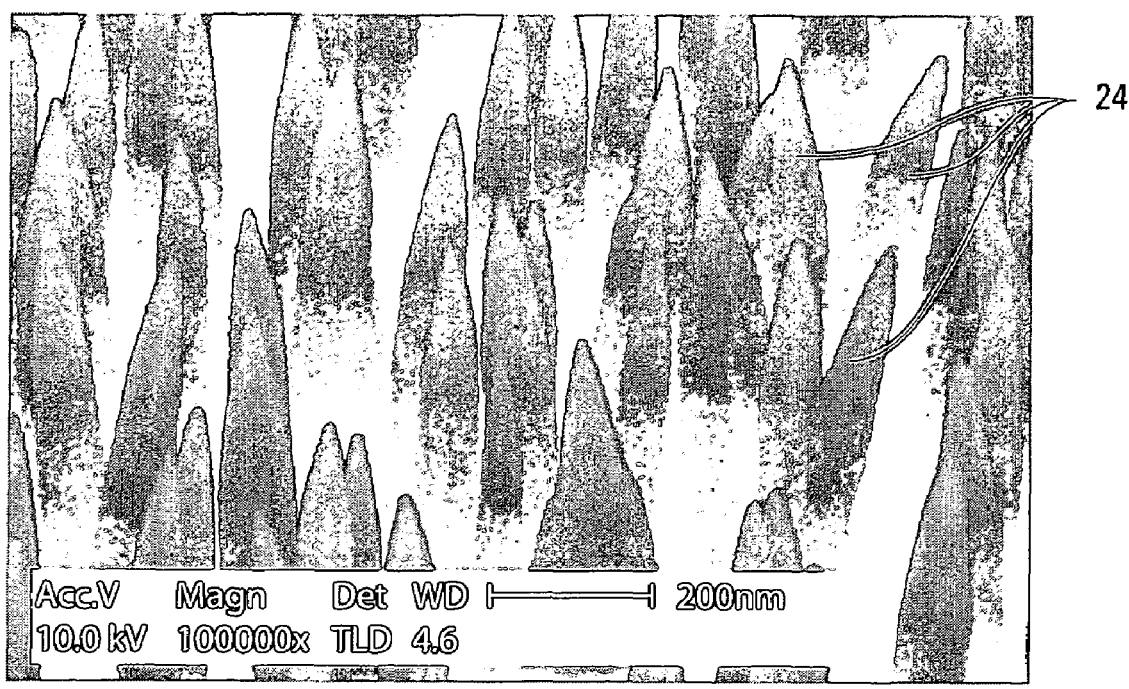
FIG. 5A shows a scanning electron microscope (SEM) image of a layer of ZnO nanoneedles formed on a Si substrate.
Figure 5C:
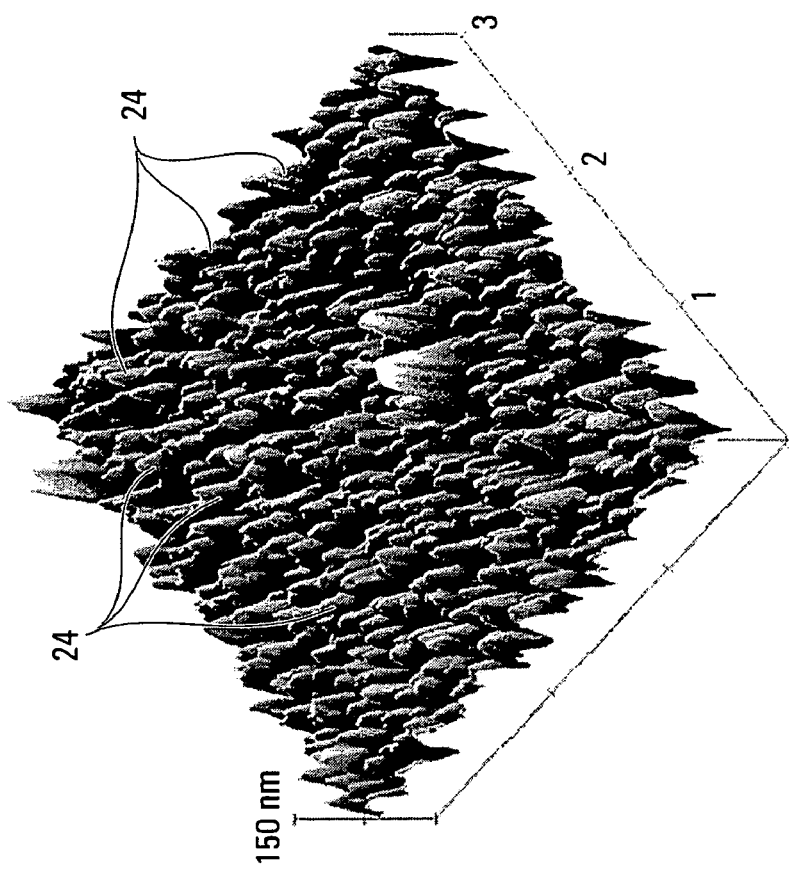
FIGS. 5B-5C show Atomic Force Microscopy (AFM) images of AlN or GaN coated ZnO nanoneedle structures.
Figure 5B:
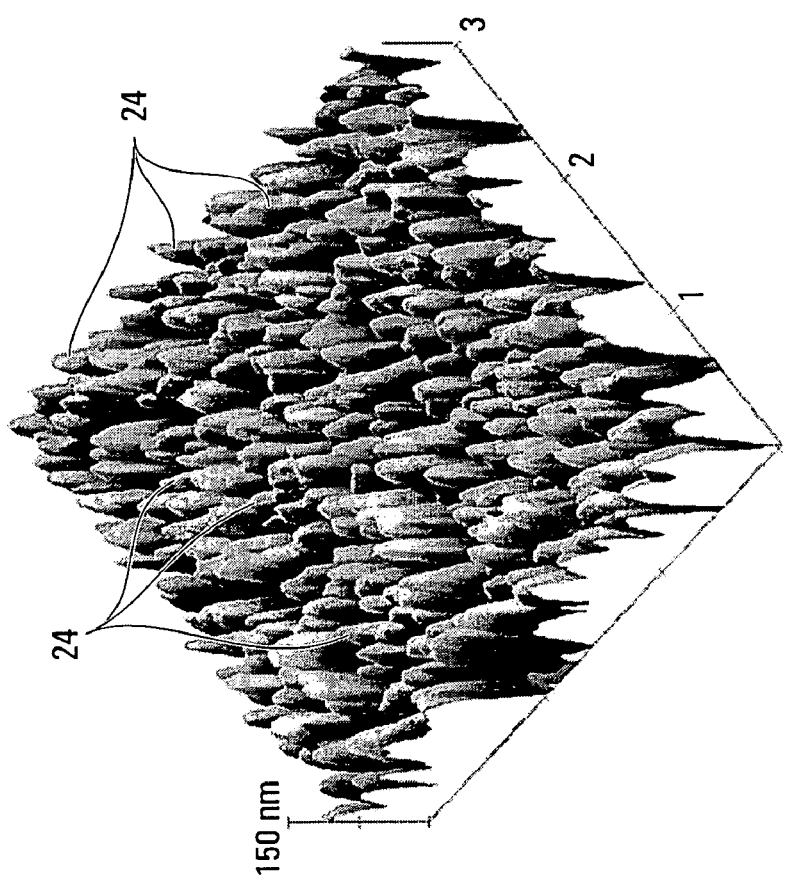

As schematically depicted, emitting structure 18 includes elongate shafts 24, which extends from supporting surface 22 of substrate 20. Each shaft 24 has a base portion 26 and a tip portion 28. It should be understood that, for clarity, FIG. 2 shows a simplified view of electron emitter 12 and is not to scale. In particular, the density and number of shafts 24 are reduced and their sizes enlarged. In an actual emitting layer, there are more shafts more densely distributed in two dimensions on supporting surface 22 of substrate 20, such as shown in FIGS. 5B and 5C. Shafts 24 can be distributed regularly or randomly. Further, actual shafts have high aspect ratios. That is, the ratio of the length and the width or diameter of a shaft 24 can be larger than what is shown in FIG. 2, as will be further described below. In addition, emitting structure 18 may be supported on a support formed by connected base portions 26 of shafts 24. Finally, it should be understood that shafts 24 have small dimensions and are densely distributed so that they may not be visible to the naked eye. To a naked eye, surface 18 may appear smooth.

Shafts 24 can have any number of suitable shapes and sizes, as will be further described below. For example, shafts 24 may have a generally cylindrical shape, a generally conical shape, a generally pencil shape, or a dome-shaped tip portion 28. Shafts 24 having a generally conical or pencil shape, or a dome-shaped tip portion may be advantageous, as will become apparent below. The average or effective diameters of shafts 24 can vary in the range of a few nanometers to several hundred nanometers. The lengths of shafts 24 can vary from a few hundred nanometers to several micrometers. The aspect ratios (i.e. length/diameter) of shafts can vary, such as from about 10 to about 200. As mentioned, an aspect ratio of a shaft 24 is the ratio between the length (or height) of the shaft 24 and the diameter of the shaft 24. The term "diameter" as used herein includes an average or effective diameter when the shaft or the portion of the shaft in question is not cylindrical. An effective diameter of a non-circular cross-section can be approximated as the diameter of a circular cross-section that has the same cross-sectional area as the non-circular cross-section. Since the diameters of shafts 24 are small, they may be measured from microscopic images such as Scanning Electron Microscopy (SEM) images and Atomic Force Microscopy (AFM) images of the shafts.

Shafts 24 can be nanotubes, nanoneedles, nanorods, nanowires, or nanofibres, as they are known in the art. Shafts 24 can form a one dimensional nanostructure, as better illustrated in FIGS. 5A and 6A, where the nanostructure extends in two (horizontal) dimensions but not in the third (vertical) dimension. The nanostructure or shafts 24 can be made from carbon or ZnO, or other suitable materials that can form a similar one-dimensional nanostructure. Suitable one-dimensional nanostructures may include Carbon nanotubes (CNTs), ZnO nanoneedles, SnO nanotubes, and nanowires made of $Cu_2O$, $In_2O_3$, GaN, AlN, InP, Si, MgO, or GaP. Suitable one-dimensional nanostructures, particularly nanowires, are also disclosed in C. R. Rao et al., Progress in Solid States Chemistry, (2003), vol. 31, pp. 5-147 ("Rao"), which is incorporated herein by reference. The CNTs can be single-walled or multi-walled. It can be advantageous if shafts 24 are in substantial parallel alignment, meaning that they are generally aligned vertically and stand generally upright as depicted in FIG. 2. However, it is not necessary that the nanostructure be aligned.

The sizes and shapes of shafts 24 may vary within a certain range. Typically, a multi-walled CNT has a length in the range of about 500 to about 1,500 nm and a diameter in the range of about 30 to about 150 nm. A ZnO nanoneedle may have a length of about 750 nm and an average diameter of about 40 nm. For a ZnO nanoneedle, the base portion may have a diameter between about 20 nm to about 300 nm and the tip portion may have a diameter between about 1 nm to about 50 nm. The aspect ratio of a nanoneedle is generally larger than 10. In other suitable nanostructures, a shaft 24 may have a diameter between about 1 nm to about 300 nm and a length between about 100 nm to about 3,000 nm.

Figure 3A:
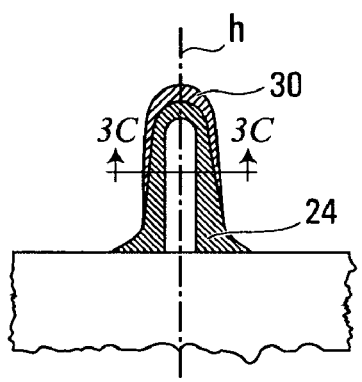
FIGS. 3A and 3B are sectional views of exemplary shafts that can be formed on the electron emitter of FIG. 2.
Figure 3B:
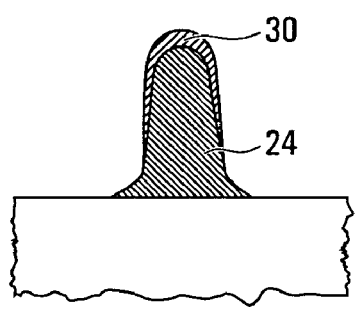

As illustrated in FIGS. 3A and 3B, the shafts can be solid or hollow. If shafts 24 are hollow, the shaft walls should be thick enough to allow sufficient emission of secondary electrons. For example, a thickness of a few nanometers may be sufficient if the radiation can penetrate only a few nanometers in depth, or when secondary electrons can only be emitted if they are produced within a few nanometers from the surface.

At least the tip portion 28 of each shaft 24 is covered by an electron emitting surface layer or coating 30. Layer 30 comprises a material exhibiting negative electron affinity, such as a wide bandgap material, and can be coated on the nanostructure formed by the shafts 24. For example, layer 30 may be formed of AlN, GaN, MgO, ZnO, alumina ($Al_2O_3$), GaP, $SiO_2$, BeO, BaO, CsCl, or the like, or any combination of these materials. Suitable materials for layer 30 are also disclosed in H. Seiler, Journal of Applied Physics, (1983), vol. 54, no. 11, pp. R1-R18, which is incorporated herein by reference, and references cited therein. AlN and GaN may be particularly advantageous for reasons described below. ZnO may also be advantageous because it is easy to coat ZnO on a nanostructure.

Figure 3C:
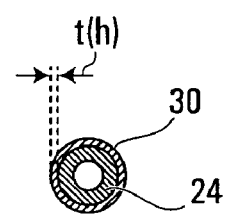
FIG. 3C is a cross-sectional view of the shaft in FIG. 3A along line 3C.

The thickness of layer 30 may vary depending on the materials and techniques used as well as the application. For example, the thickness may be between about 5 nm to about 100 nm. It may be advantageous if layer 30 has substantially uniform thickness. Layer 30 on each shaft is considered substantially uniform in thickness even when it has some gradual variation in thickness, such as in cases where, as shown in FIGS. 3A and 3C, at each height (h) the thickness (t(h)) of layer 30 is substantially constant (as shown in cross-section in FIG. 3C) but t(h) decreases towards the base portion. The variation in thickness can be, for example, up to 10% of the median or average thickness. As can be appreciated, it may be easier to form layers that gradually decrease in thickness toward base portions. Coated nanostructures in which the coating layers have substantially uniform thickness are known in the art as coaxial structures. Coaxial heterostructures (nanostructures including more than one material) can be formed at relatively low temperatures. For example, coaxial AlN layers can be formed on a nanostructure at about 500° C. Example techniques for forming coaxial heterostructures are disclosed in US patent publication No. 2002/0172820 to Majumbdar et al., published Nov. 21, 2002, which is incorporated herein by reference.

Layer 30 may cover only tip portion 28 of each shaft 24 or cover more than the tip portion. Covering the shafts 24 substantially fully, including base portion 26, can be advantageous because of increased emitting surface.

As can be appreciated, when shafts 24 tapers from base portion 26 towards tip portion 28, it may be easier to coat layer 30 substantially uniformly on shaft 24; it may also be easier to cover more than tip portions 28 of shafts 28. Thus, tapered shafts 24, such as those known in the art as nanoneedles, may be particularly advantageous. Further, as can be appreciated by persons skilled in the art, it may be easier to coat a ZnO layer on CNTs than it is to coat a MgO layer on CNTs. Example techniques suitable for coating ZnO include sputtering deposition, filtered cathodic vacuum arc, chemical vapour deposition including metal organic chemical vapour deposition (MOCVD), molecular beam epitaxy, pulsed laser deposition, and spray pyrolysis. For further information, see Y. G. Wang et al, Journal of Applied Physics, (2003), vol. 94, no. 4, pp. 1597-1604 and references cited therein, which is incorporated herein by reference. Suitable techniques for coating AlN or GaN include ion-beam-assisted deposition, dc reactive magnetron sputtering, pulsed laser deposition (PLD), arc deposition and reactive molecular beam epitaxy (MBE), vapour phase epitaxy, MOCVD, and the like. For additional information see O Ambacher, Journal of Physics D: Applied Physics, (1998), vol. 31, pp. 2653-2710, which is incorporated herein by reference, and references cited therein.

Techniques for forming one dimensional nanostructure of shafts 24 and coating layer 30 thereon are known. Any suitable techniques including known techniques may be used to form electron emitter 12. For example, techniques discussed above may be used. Further exemplary techniques for forming nanostructures are disclosed in the following references and the references cited therein: M. Tanemura et al., Applied Physics Letters, (2004), vol. 84, No. 19, pp. 3831-3833; Won Il Park et al., Advanced Materials, (2002), vol. 14, p. 1841 ["Park"]; Y. B. Li et al., Applied Physics Letters, (2004), vol. 84, pp. 3603-3605; (above for forming ZnO nanoneedles); J. T. L. Thong et al., Applied Physics Letters, (2001), vol. 79, pp. 2811-2813 (for forming vertically aligned CNTs); S. M. Yoon et al., Applied Physics Letters, (2004), vol. 84, pp. 825-827 (for forming CNTs); Y. B. Li et al., Applied Physics Letters, (2003), vol. 82, pp. 1962-1964 (for forming $MoS_2$ nanoflowers); U.S. patent application publication No. 2003/0213428 to Yicheng Lu, published Nov. 20, 2003 (for forming ZnO nanotip); U.S. patent application publication No. 2002/0175408 to Arun Majumdar, published Nov. 28, 2002 (for forming nanostructures and nanowires); U.S. Pat. No. 6,790,426 to Takashi Ohsaki, published Sep. 14, 2004 (for forming CNTs); U.S. Pat. No. 6,787,122 to Otto Z. Zhou, published Sep. 7, 2004 (for forming nanotubes); U.S. Pat. No. 6,712,864 to Kazunaga Horiuchi et al., published Mar. 30, 2004 (for forming CNTs); PCT publication WO 01/12433 to Andrew T. Hunt et al., published Feb. 22, 2001 (for forming nanostructures); Tae Yun Kim et al., Korean Journal of Chemical Engineering, (2004), vol. 21, pp. 733-738 (for forming ZnO nanoneedles). Example techniques for coating nanostructures are disclosed in the following references and references cited therein: Kim, supra; SeGi Yu et al., Physica B, (2002), vol. 323, pp. 177-179; W. K. Yi et al., Advanced Materials, (2002), vol. 14, pp. 1464-1468; Whikun Yi et al., Journal of Applied Physics, (2001), vol. 89, pp. 4091-4095 (above for forming coated CNTs); Sung Jin An, Applied Physics Letters, (2004); vol. 84, p. 3612 ["An"] (for forming GaN coated ZnO coaxial nanorods). Each of the references listed in this paragraph is incorporated herein by reference.

Figure 4:
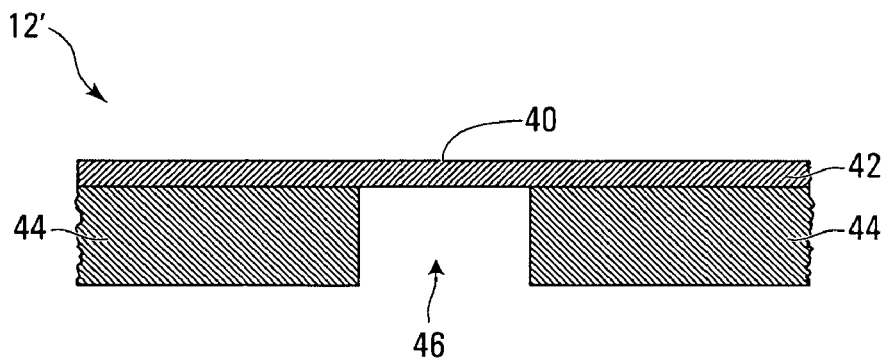
FIG. 4 is a sectional view of a thin electron emitter.

Emitter 12 can be thick or thin. A thin emitter has a thin section which has a thickness between about 1 to about 10 microns. The thin section can be a self-supporting nanostructure. A thick emitter is thicker than about 10 microns and can have a supporting substrate. For example, as shown in FIG. 4, an emitter such as emitter 12' may include a section having reduced thickness such as window 40 to allow a primary radiation to go through the emitter or secondary electrons to emit from the side of the emitter 12' opposite the incident radiation. Emitter 12' has an electron emitting layer 42 which is backed by a substrate 44. Substrate 44 has an opening 46, which can be formed by etching after layer 42 has been deposited on backing substrate 44. Window 40 can be as thin as about 1 to 2 μm and be self-supporting. The other portions of emitter 12' can have any suitable thickness for mechanical strength and support, such as between about 3 to about 5 microns. Thus, emitter 12' has a thin portion 40 that is substantially thinner than the other thick portions of emitter 12' and thin portion 40 is formed by the electron emitting nanostructure. Emitter 12' can be advantageous. For instance, it can be used as both an electron emitter and a self-supporting vacuum window at the same time, when the size of the window is relatively small, such as being about 2×2 mm or less. When not used as vacuum window, the size of the window can be larger, such as being 10×10 mm.

Emitter 12 may have multiple sensing regions thereon, such as linear or two-dimensional arrays of electron emitting regions.

Electron collector 14 (FIG. 1) can collect secondary electrons emitted from electron emitter 12 and produces a signal indicative of the amount of secondary electrons collected. Any suitable electron collectors known to person skilled in the art may be used. Electron collector 14 may be placed, disposed or mounted in the vicinity of electron emitter 12 in any suitable manner so as to effectively collect emitted electrons from electron emitter. For example, electron collectors, detectors, and multipliers described in "Radiation Detection and Measurement," by G. E. Knoll, 3$^{rd}$ ed., John Wiley & Sons, Inc., New York (2000) ["Knoll"], which is incorporated herein by reference, may be used. Electron collector 14 may include components typically found in conventional electron collectors or detectors such as cathode, anode, dynode, grid, vacuum tubes and the like. It may also include electron-multiplication components such as channel multipliers. Suitable electron collectors include commercially available electron multipliers or detectors, such as Channeltron™ or micro-channel plate (MCP) detectors. Collector 14 should have adequate collecting characteristics for collecting electrons emitted from emitter 12. For example, as the emission yield of emitter 12 is high, collector 14 should be capable of collecting, and producing the signal, at a correspondingly high rate. In this regard, a Channeltron having a counting rate above 1 MHz and a signal rising time of 2 to 3 ns may be suitable. MCP detectors having counting rates in excess of 10 MHz and signal rising time of about 250 ps may also be suitable.

Collector 14 can include a position-sensitive detector such as a position-sensitive silicon detector or MCP detector. As can be appreciated, position-sensitive detection can be one dimensional or two dimensional. In alternative embodiments, a scintillating material may be deposited on the emitter so that light generated by secondary electrons can be visually monitored or recorded to determine the emission sites, such as by a charge coupled device (CCD) camera.

Two-dimensional detectors could be formed in many configurations. For example, a thin, self-supported layer of electron emitting layer, such as one shown in FIG. 4, may be placed before a two-dimensional MCP or two-dimensional surface barrier detector. Alternatively, the electrons emitted from the front side of the emitter, as shown in FIG. 1, may be collected by position-sensitive collectors. Fine screens or grids may be placed either in the path of the incident radiation or in the path of the emitted electrons for better spatial definition. An electric or magnetic field, or both, can be used to direct the emission electrons from the point of emission to the point of detection in a predicable manner such that the spatial information is perseved. These techniques standard techniques and can be readily understood by persons of skill in the art.

As a further example, a position-sensitive radiation detector may include a thin emitter foil mounted at an angle, such as 45 degrees, to the direction of the incident primary beam, electrostatic system for secondary electron acceleration, demagnification and focalization, which is mounted perpendicular to the foil, and a pad or pixel silicon sensor mounted at the focal plane parallel to the foil. Existing silicon sensors can record 2-dimensional (2D) images of the incident beam profiles with up to 20 kHz frame-rate. The sensor can be sensitive to low (about 20 keV) energy secondary electrons and has a high dynamic range (from a few to about $10^3$ electron/pad/100 µs) with no dead time. A typical Si substrate can be sized 30×30 mm and have a spatial resolution of about 1 mm, or sized 10×10 mm and have a spatial resolution of about 200 µm, for detecting low energy (about 20 keV) electrons. Monolithic active pixel sensors can be 20×20 mm in size and have a spatial resolution of about 20 µm.

Signal processor 16 is operatively connected to collector 14 for processing the signal produced by collector 14 for display or further analysis. Signal processors used in conventional radiation detectors, such as those described in Knoll, supra, may be used. For example, signal processor 16 may include signal communication and computing components, such as specially designed signal coupling network, signal preamplifiers, and other data processing components. Signal processor 16 may produce data indicating the intensity of the primary radiation, the energy or energy distribution of the primary radiation, the location of incidence of the primary radiation, the time dependence of any or a combination of the foregoing, and the like. While conventional signal processor or signal processing systems can be adopted for use as signal processor 16, special signal processors may be developed to take advantage of the special properties and emission characteristics of emitter 12, which will be discussed below.

Detector 10 may also include other optional or necessary components, such as power supply, electronic or magnetic field generators, beam focusing and guiding components, field or radiation shielding components, vacuum components, electronic timing components, control components, mechanical mounting components, and the like. Persons skilled in the art can readily understood and appreciate when these other components are needed and how to install and operate them.

In operation, a radiation beam, indicated in FIG. 1 by the large arrow, is directed to emitting structure 18 of emitter 12. The incident radiation causes emitter 12 to emit secondary electrons, which are subsequently collected by collector 14. Collector 14 produces a signal dependent on and indicative of the amount and certain physical properties, such as energy, of the collected electrons. The signal is processed by signal processor 16 so that it can be displayed or further analysed, for example to indicate the presence or a characteristic of the primary radiation. Detector 10 can be generally used or operated in similar manners as for a conventional radiation detector. Detector 10 can also be used for the same purposes for which a conventional radiation detector can be used. However, detector 10 has certain advantages over conventional detectors and can be used in applications where conventional radiation detectors are not suitable, as will become more apparent below.

When emitter 12 and collector 14 are capable of producing signals indicating positions of emission electrons, i.e. position sensitive, detector 10 can be used to perform position-sensitive detection and spatial imaging.

Detector 10 can have near 100% detection efficiency under certain conditions for various radiations including charged particles and light radiations. Unless expressly indicated otherwise, "efficiency" herein refers to intrinsic peak efficiency. Detection efficiency may be measured using techniques known to person of skill in the art, including those described in knoll, supra. The expected detection efficiencies of detector 10 are compared with conventional detectors in Table I for various incident radiations.

TABLE I

Detection Efficiencies (in %) for Different Incident Radiations

| Detector Type | Ions | X-rays | Electrons |
|---|---|---|---|
| MCP | 10-40 | <10 | up to 100 |
| Surface barrier | up to 100 | Low | Low |
| High purity Ge | Low | 10-98 | Low |
| B-doped CVD diamond | 50-99 | unknown | Expected >50 |
| Detector 10 | Expected >99 | Expected 50-100 | Expected up to 100% |

As can be seen in Table I, detector 10 has high detection efficiency for all three types of radiation. The high detection efficiency of detector 10 is due to the high secondary electron emission yields of emitter 12 under all types of radiation.

The electron emitter 12 has a high emission yield in comparison to conventional electron emitters, as will be further described below. "Emission yield" means the ratio of the number of secondary electrons emitted per primary incident charged particle. Thus, an emission yield of 1,000 means that, on average, the material emits 1,000 secondary electrons in response to being bombarded by one charged particle. Emission yield can be measured by directing a high flux of charged particles such as protons or electrons onto the surface of the specimen to be measured and measuring the difference in the specimen current when negative and positive bias voltages are applied to the specimen. Emission yields can also be measured by detecting the secondary electrons emitted from the specimen when irradiated with a beam of radiation with a fixed intensity. For example, emission yield can be measured using the techniques described in Kim, supra. An example procedure is also described below.

Although unverified, and without being limited to any particular theory, there may be at least three reasons for the high electron emission yield. First, because of the surface structures (shafts 24), the primary radiation is mostly incident on the emitter layer 30 at a small incident angle. Consequently, the incident energy will be dispersed close to the surface. Thus, it is easier for the excited secondary electrons to escape and be emitted. In this regard, within a limit the larger the aspect ratio of shafts 24, the larger the emitting surfaces that have small incident angles and, likely, the higher emission yield. Thus, shafts having a conical or pencil shape or a dome-shaped tip portion may be advantageous. Aligned shafts may also be advantageous. Secondly, the small (nanoscale) dimensions of shafts (diameters or widths), particularly at narrow tip portion, can result in very high local fields being generated by incident radiation. The high local fields can accelerate the excited secondary electrons towards the surface. An avalanche effect may even result: continued radiation causes increasingly large local fields. In this regard, within a limit the smaller the diameters of shafts, the higher the local field effect, and thus, the higher emission yield. Thus, a thin emitting layer and aligned and tapered shafts may be advantageous. Thirdly, when shafts 24 are thin, it is possible that the primary radiation will penetrate one or more shafts 24 and thus incident on multiple shafts. Further, backscattered secondary electrons may also cause further secondary electron emissions when they hit neighbouring shafts 24. Again, an avalanche effect may result. In this regard, thinner shafts may be advantageous.

As now can be appreciated, generally conical or pencil shaped shafts, or shafts with dome-shaped tip portions, such as nanoneedles can be particularly advantageous. Further, generally aligned shafts can be advantageous. It is also advantageous to have larger coating areas on the shafts.

It can also be understood that it may be difficult for secondary electrons emitted from base portions 26 of shafts 24 to escape from emitter 12 when shafts 24 are aligned. Therefore, increasing the lengths of aligned shafts 24 beyond a limit may negatively affect the emission yield of emitter 12. Further, while increasing shaft density within a limit can increase emission yield, increasing the density beyond the limit may negatively affect emission yield because of reduced emission away from the tip portions of the shafts. The distances between adjacent shafts 24, or the density of shafts 24, can be chosen to adjust or maximize emission yield. As can be understood, if the distances are too large, emission yield may be low because too few shafts 24 can be provided within a given area. On the other hand, if the distances are too small, i.e., shafts 24 are too closely packed, the so-called screening effect may become significant and cause reduction in emission yield, as will become more apparent from description below. Electrostatic calculations indicate that emission yield can be optimized when the separation distances between shafts 24 are between about one to two times of the average length of shafts 24.

Detector 10 can have not only almost 100% detection efficiency but also very high detection rate, such as more than 10 MHz or even more than 20 MHz. However, as can be appreciated, detection efficiency can decrease when the detection rate increases, due to characteristics of the electron collector used.

Detector 10 can be used in various applications. For example, detector 10 may be used to detect charged particle beams, electromagnetic radiation, X-rays, UV radiation and the like. Charged particles can be electrons, protons or ions. Among others, detector 10 can be used in high speed radiation counting systems, secondary ion mass spectroscopy systems (SIMS), time-of-flight (TOF) systems, Rutherford backscattering systems (RBS), proton-beam induced X-ray emission (PIXE) systems, X-ray fluorescence (XRF) detector systems, or energy dispersive X-ray (EDX) detection systems such as SEMs.

As discussed above, emitter 12 can have a very thin portion. Some of the benefits of thin emitters are that emitted electrons may also be detected from the substrate side, instead of from the emitting layer side, and that a primary radiation can go through the emitter, in some cases at low energies.

For emitters having larger emitting areas, a thicker substrate may be needed. The size of a thick emitter can vary, but may have an upper limit depending on the production process of the coated nanostructure and the required efficiency for secondary electron collection.

In alternative embodiments, the supporting surface of the substrate of the emitter can be contoured and need not be generally planar.

Several example electron emitters, listed in table II, have been formed as described below. Samples V and VI are emitters formed for comparison purposes.

TABLE II

Sample Emitters and Comparison Emitters

| Sample | Substrate | Nanostructure | Emitting layer |
|---|---|---|---|
| I | n-type Si | ZnO nanoneedles | AlN |
| II | n-type Si | ZnO nanoneedles | GaN |
| III | n-type Si | Aligned multi-walled CNT | ZnO |
| IV | n-type Si coated with Fe—N | Aligned multi-walled CNT | ZnO |
| V | n-type Si | Boron-doped diamond | — |
| VI | n-type Si | Aligned muti-walled CNT | MgO (latest results) |

In preparation of samples I and II, ZnO nanoneedles were formed on Si substrates using a MOCVD system. The reactants were diethylzinc and oxygen, fed through the system at flow rates in the range of 20 to 100 sccm and 0.5 to 5 sccm respectively. Typical growth temperatures were in the range of 400 to 500° C. No metal catalyst was coated on the substrates during nanoneedle growth. The typical length and diameter of nanoneedles were 750 and 40 nm respectively. Further details for preparation of these ZnO nanoneedle can be found in Park. FIG. 5A shows an image of the nanostructure of ZnO nanoneedles formed. A coating of AlN or GaN was deposited on the ZnO nanoneedles directly. The deposition was performed using low pressure metal-organic vapor phase epitaxy (MOVPE) technique. The precursors for AlN and GaN were respectively trimethyl-Al (TMAl) and trimethyl-Ga (TMGa). Further details on coating AlN/ZnO and GaN/ZnO on coaxial heterostructures can be found in An, supra. The AlN and GaN coatings were about 10 to 13 nm and 7 to 10 nm thick, respectively. FIGS. 5B and 5C show AFM images of emitting layers of the resulting emitters.

In preparation of sample III, a multi-walled and aligned CNT nanostructure was formed on a Si substrate and a thin film of ZnO was deposited on the aligned CNTs using filtered cathodic vacuum arc (FCVA) technique. High purity (about 99.99%) zinc was used as the cathode target and an oxygen gas was introduced into the chamber for the formation of ZnO, under the following conditions: oxygen gas flow rate at 70 sccm, working pressure at $4 \times 10^{-5}$ torr, and arc current at 60 A. The thickness of the ZnO film on the silicon substrate, measured by a surface profiler, was found to be about 450 nm after 10-minute deposition at room temperature.

For sample IV, aligned, multi-walled CNTs were synthesized by chemical vapor deposition on Fe—N coated Si substrates. The substrate was prepared by depositing a Fe—N film on an n-type Si wafer with filtered cathodic vacuum arc (FCVA) technique. Iron target of 99.99% purity was used. The deposition pressure was kept at $5 \times 10^{-5}$ torr by adjusting the nitrogen (purity 99.99%) gas flow rate. The arc current was set to 100 A. The Fe—N film was then placed into the centre of a tube furnace. The base pressure of the reactor was evaluated to $10^{-2}$ torr using a rotary pump. It took about 10 minutes to heat up the substrate from room temperature to 600° C. with the flowing gas mixture of $H_2$ and $N_2$ in a ratio of 90 to 30 sccm. Acetylene ($C_2H_2$) of 10 sccm was then introduced into the chamber when the temperature reached 600° C. The growth pressure was maintained at 10~20 torr during the CVD process and the growth time was set at 5 min. A layer of ZnO was then deposited on the CNTs in a similar manner as in the preparation of sample III.

Figure 6A:
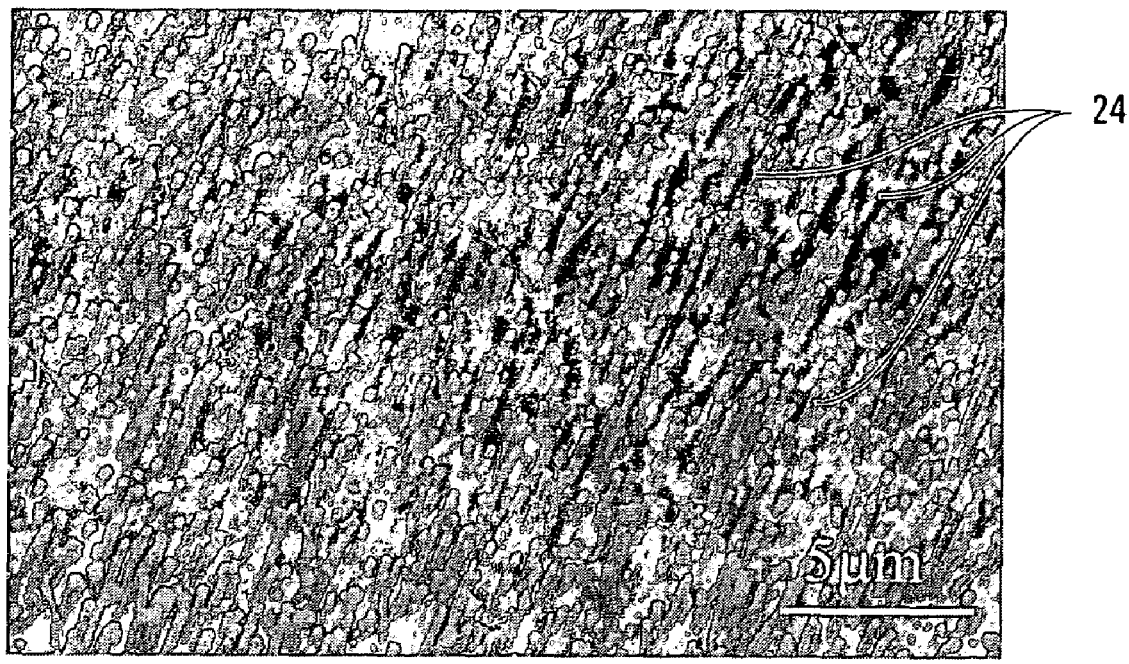
FIG. 6A shows a SEM image of a layer of carbon nanotubes (CNT) formed on a Si substrate.
Figure 6B:
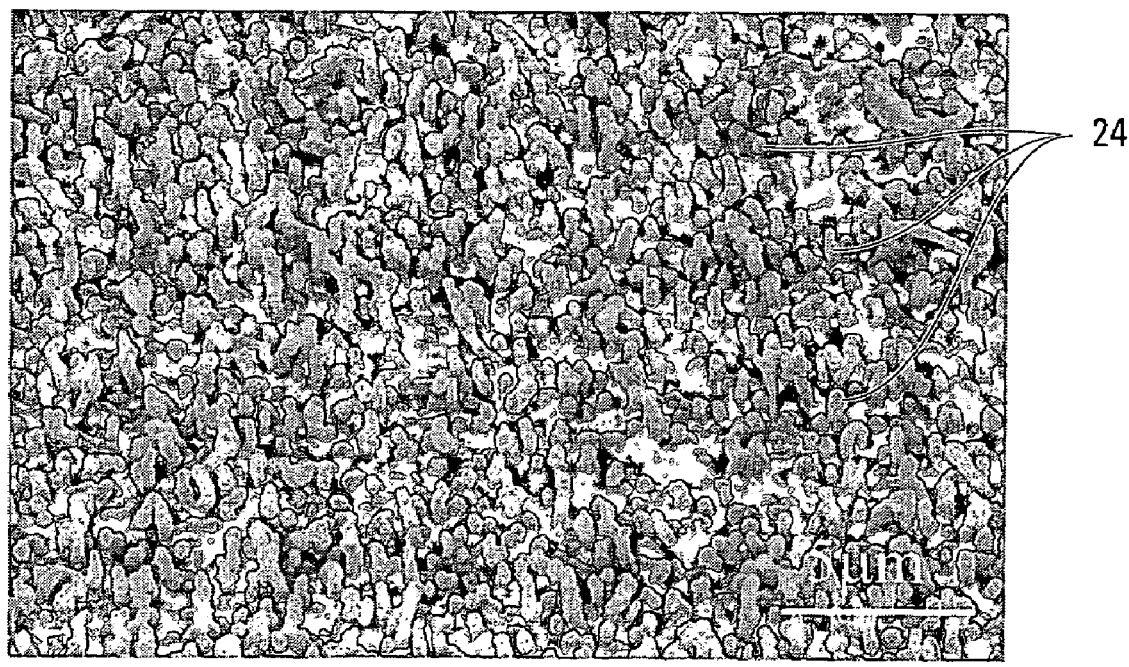
FIG. 6B shows a SEM image of a layer of coated CNTs.

The typical lengths and diameters of the formed CNTs in samples III and IV were around 0.5~1.5 μm and 30~150 nm, respectively. SEM images of uncoated and coated CNT nanostructures are shown in FIGS. 6A and 6B.

Secondary electron emission yield (σ) of each sample was measured using a beam of primary electron, which was generated by the electron gun of an SEM (model JEOL-JSM-5910LV). The beam intensity was measured by a Faraday cup attached to the SEM system and was fixed at 100 pA. The electron beam energy was varied from 0.8 to 20 keV. The samples were biased with a 45 V battery. Sample to ground currents were measured by a low noise current preamplifier (Stanford Research Systems, SR570). Two specimen currents for each sample were measured when the sample was respectively biased positively ($I_p$) and negatively ($I_n$). The positive bias was adequate to ensure that the measured current ($I_p$) equals the incident primary electron current. The negative bias caused the secondary electrons to move away from the sample surface and reduced the sample-to-ground current by the amount of secondary electrons produced. The secondary electron emission yield was thus calculated from $$\sigma = (I_p - I_n)/I_p. \qquad (1)$$

Test results showed that samples I to IV exhibited higher secondary electron emission yields than samples V and VI when the energy of the primary electron beam was lower than about 1 keV.

It is expected from the test results that detectors having samples I to IV as electron emitters could exhibit better than 99% detection efficiency for radiations of ions, electrons and X-rays. The observed emission efficiency of secondary electrons were much higher than conventional electron emitters, particularly when incident primary radiation had low energies, such as an electron beam having a kinetic energy below about 1 kev. Further, the emission yields of the sample emitters were high even at low biasing voltages, such as at 45 V.

Other features, benefits and advantages of the embodiments described herein not expressly mentioned above can be understood from this description and the drawings by those skilled in the art.

Of course, the above described embodiments are intended to be illustrative only and in no way limiting. The described embodiments are susceptible to many modifications of form, arrangement of parts, details and order of operation. The invention, rather, is intended to encompass all such modification within its scope, as defined by the claims.

What is claimed is:

1. A radiation detector comprising:
   an electron emitter including
     a support,
     a plurality of shafts extending from said support, each one of said plurality of shafts tapering from a base portion toward a tip portion, said tip portion having a diameter between about 1 nm to about 50 nm and said base portion having a diameter between about 20 nm to about 300 nm, each one of said shafts having a length between about 100 nm to about 3,000 nm and an aspect ratio larger than 10,
     a coating covering at least said tip portions of said plurality of shafts, said coating exhibiting negative electron affinity and being capable of emitting secondary electrons upon being irradiated by radiation;
   an electron collector positioned to collect electrons emitted from said electron emitter and to produce a signal indicative of the amount of electrons collected; and a signal processor operatively connected to said electron collector for processing said signal to determine a characteristic of said radiation.

2. The detector of claim 1, wherein said shafts are substantially made of zinc oxide (ZnO).

3. The detector of claim 1, wherein said coating on each one of said shafts covers both said tip portion and said base portion thereof and has substantially uniform thickness.

4. The detector of claim 1, wherein said coating covers more than said tip portion.

5. The detector of claim 3, wherein said substantially uniform thickness has a median or average, and wherein variation in said substantially uniform thickness is less than 10% of said median or average.

6. The detector of claim 1, wherein said coating comprises a wide bandgap material.

7. The detector of claim 6, wherein said wide bandgap material comprises at least one of AlN, GaN, MgO, ZnO, $Al_2O_3$, GaP, $SiO_2$, BeO, BaO, and CsCl.

8. The detector of claim 1, wherein said emitter has a section having reduced thickness so as allow said radiation to transmit through said section or emit secondary electrons from a side of said emitter opposite said radiation.

9. The detector of claim 8, wherein said section of said emitter is about 1 to 2 µm thick.

10. The detector of claim 1, wherein said shafts are substantially aligned.

11. The detector of claim 1, wherein said electron collector is sensitive to emitting positions of said electrons emitted from said electron emitter.

12. The detector of claim 11, wherein said electron collector comprises a position-sensitive silicon electron detector or a position-sensitive MCP electron detector.

13. The detector of claim 11, wherein said electron collector comprises a scintillator for converting collected electrons to light and recording an image generated by said light.

14. The detector of claim 1, wherein said electrons can be detected at a rate higher than 10 MHz.

15. The detector of claim 14, wherein said electrons can be detected at a rate higher than 20 MHz.

16. A radiation detector comprising:
an electron emitter having a supporting surface and a nanostructure disposed on said supporting surface, said nanostructure comprising carbon nanotubes (CNTs) coated with a material selected from the group of aluminum nitride (AlN), gallium nitride (GaN), and zinc oxide (ZnO), said nanostructure capable of emitting secondary electrons upon being irradiated by radiation;
an electron collector for collecting electrons emitted from said electron emitter and for producing a signal indicative of the amount of electrons collected; and
a signal processor operatively connected to said electron collector for processing said signal to determine a characteristic of said radiation.

17. The detector of claim 16, wherein surfaces of said CNTs are substantially fully coated with said material.

18. The detector of claim 16, wherein said electron emitter has a section having reduced thickness so as allow said radiation to transmit through said section or emit secondary electrons from a side of said emitter opposite said radiation.

19. The detector of claim 18, wherein said section of said electron emitter is about 1 to 2 µm thick.

20. A method of detecting radiation, comprising:
directing radiation to a nanostructure comprising a plurality of shafts, each one of said plurality of shafts having a surface layer exhibiting negative electron affinity, said surface layer having substantially uniform thickness; and
detecting secondary electrons excited by said radiation and emitted from said nanostructure so as to detect said radiation,
wherein said substantially uniform thickness has a median or average, and wherein variation in said substantially uniform thickness is less than 10% of said median or average.

21. A method of detecting radiation, comprising:
directing radiation to a nanostructure comprising a plurality of shafts, each one of said plurality of shafts having a surface layer exhibiting negative electron affinity, said surface layer having substantially uniform thickness; and
detecting secondary electrons excited by said radiation and emitted from said nanostructure so as to detect said radiation,
wherein said nanostructure comprises one or more of, nanoneedles, nanorods, nanowires, and nanofibres.

22. A method of detecting radiation, comprising:
directing radiation to a nanostructure comprising a plurality of shafts, each one of said plurality of shafts having a surface layer exhibiting negative electron affinity, said surface layer having substantially uniform thickness; and
detecting secondary electrons excited by said radiation and emitted from said nanostructure so as to detect said radiation,
wherein said shafts are substantially fully covered by said layer.

23. A method of detecting radiation, comprising:
directing radiation to a nanostructure comprising a plurality of shafts, each one of said plurality of shafts having a surface layer exhibiting negative electron affinity, said surface layer having substantially uniform thickness; and
detecting secondary electrons excited by said radiation and emitted from said nanostructure so as to detect said radiation,
wherein said surface layer comprises a wide bandgap material.

24. The method of claim 23, wherein said wide bandgap material is selected from the group of AlN, GaN, MgO, ZnO, $Al_2O_3$, GaP, $SiO_2$, BeO, BaO, and CsCl.

25. A radiation detector comprising:
an electron emitter including
a support;
a plurality of shafts extending from said support, each one of said plurality of shafts tapering from a base portion toward a tip portion, said tip portion having a diameter between about 1 nm to about 50 nm and said base portion having a diameter between about 20 nm to about 300 nm, each one of said shafts having a length between about 100 nm to about 3,000 nm and an aspect ratio larger than 10; and
a coating covering at least said tip portions of said plurality of shafts, said coating exhibiting negative electron affinity and being capable of emitting secondary electrons upon being irradiated by radiation.

26. The radiation detector of claim 25, wherein said shafts are made substantially of ZnO.

27. The radiation detector of claim 26, wherein said coating comprises a material selected from the group of AlN, GaN, MgO, ZnO, $Al_2O_3$, GaP, $SiO_2$, BeO, BaO, and CsCl.

28. A radiation detector comprising:
an electron emitter having a supporting surface and a nanostructure disposed on said supporting surface, said nanostructure comprising carbon nanotubes (CNTs) coated with a material selected from the group of aluminum nitride (AlN), gallium nitride (GaN), and zinc oxide (ZnO), said nanostructure capable of emitting secondary electrons upon being irradiated by radiation.

29. A radiation detector comprising:
an electron emitter including
 a support,
 a plurality of nanoneedles extending from said support,
 a coating covering at least a tip portion of each one of said plurality of nanoneedles, said coating exhibiting negative electron affinity and being capable of emitting secondary electrons upon being irradiated by radiation;
an electron collector positioned to collect electrons emitted from said electron emitter and to produce a signal indicative of the amount of electrons collected; and
a signal processor operatively connected to said electron collector for processing said signal to determine a characteristic of said radiation.

* * * * *